US011317618B2

(12) United States Patent
Hinsch et al.

(10) Patent No.: US 11,317,618 B2
(45) Date of Patent: May 3, 2022

(54) DEVICE AND METHOD FOR SUBJECTING A FLYING INSECT TO LETHAL RADIATION

(71) Applicant: Fraunhofer-Gesellschaft zur Forderung Angewandten Forschung e.V., Munich (DE)

(72) Inventors: Andreas Hinsch, Freiburg (DE); Lukas Wagner, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 60 days.

(21) Appl. No.: 17/042,420

(22) PCT Filed: Mar. 26, 2019

(86) PCT No.: PCT/EP2019/057635
§ 371 (c)(1),
(2) Date: Sep. 28, 2020

(87) PCT Pub. No.: WO2019/185656
PCT Pub. Date: Oct. 3, 2019

(65) Prior Publication Data
US 2021/0007342 A1    Jan. 14, 2021

(30) Foreign Application Priority Data

Mar. 27, 2018   (DE) .................. 102018107274.0

(51) Int. Cl.
*A01M 1/22*   (2006.01)
*G01J 1/42*   (2006.01)
*G01J 1/04*   (2006.01)

(52) U.S. Cl.
CPC ........... *A01M 1/226* (2013.01); *G01J 1/0403* (2013.01); *G01J 1/0411* (2013.01); *G01J 1/429* (2013.01); *A01M 2200/012* (2013.01)

(58) Field of Classification Search
CPC ............ A01M 1/226; A01M 2200/012; A01M 1/026; G01J 1/0403; G01J 1/0411; G01J 1/429
See application file for complete search history.

(56) References Cited

U.S. PATENT DOCUMENTS 10,468,196 B2   11/2019   Hinsch et al.
10,729,124 B2 *   8/2020   Marka ..................... F21V 14/02
(Continued)

FOREIGN PATENT DOCUMENTS

CN   102165943 A  *  8/2011
CN   106719524 A  *  5/2017   .............. A01M 1/22
(Continued)

OTHER PUBLICATIONS

Wagner et al., ACS Energy Letters, "High Photovoltage of 1 V on a Steady-State Certified Hole Transport Layer-Free Perovskite Solar Cell by a Molten-Salt Approach", DOI: 10.1021/acsenergylett. 8b00293, pp. 1122-1127, Mar. 16, 2018.
Abate et al., Chem Pub Society Europe, Perovskite Solar Cells: From the Laboratory to the Assembly Line:, DOI: 10.1002/chem. 201704507, 18 pages, Oct. 27, 2017.
Goetzberger, A. et al., Applied Physics, "Solar Energy Conversion with Florescent Collectors", pp. 123-139, 1977.

*Primary Examiner* — Marcus H Taningco
(74) *Attorney, Agent, or Firm* — Volpe Koenig

(57) ABSTRACT

A device for subjecting a flying insect to lethal radiation. The device has a measurement beam source for producing a measurement beam, a deflection unit for deflecting the measurement beam, a lethal radiation source for producing a lethal beam and a measurement beam detector. The measurement detector has a photodetector element, the deflection unit and the measurement beam detector are arranged and cooperate such that the measurement beam sweeps the detector surface of the measurement beam detector. The
(Continued)

device includes an evaluation unit connected to the measurement detector and the lethal light source to determine an attenuation time period of an attenuation of the measurement beam between the deflection unit and the detector surface and to control the lethal light source depending on said attenuation time to emit a lethal beam impulse. A method for subjecting a flying insect to lethal radiation is also provided.

20 Claims, 4 Drawing Sheets

(56) References Cited

U.S. PATENT DOCUMENTS

| | | | |
|---|---|---|---|
| 2004/0140900 A1* | 7/2004 | Barber | A01M 1/24 340/573.2 |
| 2007/0120690 A1* | 5/2007 | Barber | A01M 1/24 340/573.2 |
| 2010/0186284 A1 | 7/2010 | Hyde et al. | |

FOREIGN PATENT DOCUMENTS

| | | | | |
|---|---|---|---|---|
| CN | 110122452 A | * | 8/2019 | |
| CN | 112425403 A | * | 3/2021 | |
| DE | 102013216848 | | 2/2015 | |
| EP | 176358 | | 4/1986 | |
| KR | 20100036417 A | * | 4/2010 | |
| WO | WO-2012171445 A1 | * | 12/2012 | ............ A01M 1/226 |
| WO | 2013069059 | | 5/2013 | |
| WO | 2015160958 | | 10/2015 | |
| WO | 2017152737 | | 9/2017 | |

* cited by examiner

DEVICE AND METHOD FOR SUBJECTING A FLYING INSECT TO LETHAL RADIATION

TECHNICAL FIELD

The invention relates to a device and to a method for subjecting a flying insect to exterminating radiation.

BACKGROUND

In various situations, flying insects constitute a nuisance or even a threat. This is the case in particular for biting flying insects such as for example mosquitoes, and to an even greater extent for flying insects that transmit diseases to humans, such as for example the transmission of malaria by female mosquitoes. Combating flying insects using chemical means, such as for example DDT, entails negative long-term consequences for people and the environment. There is therefore a need to exterminate flying insects without applying chemical means.

US 2010/0186284 A1 discloses a device for identifying insects by way of a camera and exterminating them by way of a laser beam. This device has a complex and thus expensive design that is susceptible to faults. Applying them in large numbers, in particular in developing countries or areas with little technical infrastructure, therefore proves difficult.

SUMMARY

The present invention is based on the object of providing a method and a device for subjecting a flying insect to exterminating radiation, which device is technically less complex and less expensive to produce in comparison with the previously known device.

This object is achieved by a device and by a method having one or more features of the invention defined herein.

The device according to the invention is preferably designed to perform the method according to the invention, in particular a preferred embodiment thereof. The method according to the invention is preferably designed to be performed by way of the device according to the invention, in particular a preferred embodiment thereof.

The device according to the invention for subjecting a flying insect to exterminating radiation has a measurement beam source for generating a measurement beam, a deflection unit for deflecting the measurement beam, an exterminating beam source for generating an exterminating beam and a measurement beam detector.

What is essential is that the measurement beam detector has a photodetector element, that the deflection unit and the measurement beam detector are arranged and designed such that the measurement beam scans the detector surface of the measurement beam detector, that the device comprises an evaluation unit that is connected to the measurement beam detector and the exterminating light source in order to ascertain an attenuation duration of an attenuation of the measurement beam between the deflection unit and the detector surface and to actuate the exterminating light source so as to output an exterminating beam pulse on the basis of the attenuation duration.

The present invention is based on the finding that devices that detect flying insects by way of reflecting radiation from the flying insects exhibit considerable disadvantages: Since light radiation is typically reflected from the flying insect in the direction of a detector only with a partial intensity, a high expenditure in terms of apparatus is required, for example providing a high-resolution and light-intensive camera. This already causes high costs. The targeted extermination of an insect on the basis of detection by way of a camera image furthermore requires complex calculation methods and optical deflection units for the exterminating beam in order to be able to subject the insect to exterminating radiation with the required speed and accuracy. If on the other hand wide area emission of exterminating radiation is intended, then this requires considerable intensities that may in particular constitute a hazard to the eyes of a human.

The present invention is based on a structural alternative that brings about a considerable simplification and thus cost reduction and lower susceptibility to faults: The device according to the invention provides a deflection unit by way of which the measurement beam is deflected such that it scans a detector surface of the measurement beam detector. If a flying insect is then in the beam path between the deflection unit and the measurement beam detector, then detection is possible more easily and in a manner less susceptible to faults in comparison with the previously known prior art. One essential aspect of the present invention is thus based on the fact that the interruption or at least attenuation of the measurement beam by a flying insect is used to detect the flying insect. It is thus in particular not absolutely necessary to use an expensive camera having a high-resolution CCD chip operating at high speed.

It has however been assumed up to now that detectors having a sufficient detector surface and a sufficient detection speed are not available, or at least not available inexpensively, for such an application.

The photodetector element is therefore preferably designed as a detector element from the following group, wherein a reference for a preferred model is given in each case in brackets:

perovskite photodetector element
(DOI: 10.1038/ncomms6404),
GaAs-based photodetector element
(DOI: 10.1109/LPT.2018.2815273), in particular with a thin-film design (DOI: 10.1038/srep30107)
Si—PIN photodetector element
(commercially available),
an amorphous silicon-based photodetector element (DOI: 10.1063/1.360827),
a CIGS photodetector element
(DOI: 10.1039/C7TC01462G),
graphene photodetector element
(DOI: 10.1038/nnano.2009.292),
a photodetector element based on organic photovoltaics (DOI: 10.1364/optica.2.000607).

It is particularly advantageous for the measurement beam detector to have a perovskite photodetector element: The photodetector element is preferably designed as a perovskite photodetector element. Such perovskite elements are known at present only for use in power generation, that is to say for use as a solar cell. One essential advantage of such perovskite elements is however that there is a comparatively rapid charge carrier dissipation and thus rapid switching times, in particular rapid detection times are achieved for intensity changes of radiation incident on a detector surface of the perovskite photodetector element.

With regard to the design of the perovskite photodetector element, use may be made here of the previously known design of perovskite solar cells, as described for example in DE 10 2013 216 848 A1. EP 0 176 358 B1 additionally discloses an image capturing device having a light source and a deflection means in the form of a rotating polygonal mirror.

In contrast to the previously known device, in the present invention, the measurement beam is thus deflected by way of a deflection unit such that it scans the detector surface of the measurement beam detector. It thus forms a detection region between the deflection unit and the detector surface. If a flying insect is in this detection region and is impacted by the measurement beam, then the radiation incident on the measurement beam detector decreases. The evaluation unit may be used to easily ascertain such a signal change in the signal of the measurement beam detector.

It is desirable in this case to distinguish between smaller moving objects and objects moving slowly with respect thereto and/or larger objects. The evaluation unit of the present invention is therefore designed to determine an attenuation duration of an attenuation of the measurement beam between the deflection unit and the detector surface. The attenuation duration is a measure of the size and speed of the detected object: Smaller and faster objects generate a shorter interruption in the measurement beam in comparison with slower and/or larger objects.

In the device according to the invention, the exterminating light source is therefore actuated so as to output an exterminating beam pulse depending on the ascertained attenuation duration.

It is thereby easily possible to avoid an exterminating beam pulse being output when for example a human moves through the beam path of the measurement beam between the deflection unit and the measurement beam detector.

The above-described classification of objects that are intended to be subjected to exterminating radiation on the basis of the duration of the interruption of the measurement beam requires high temporal detection accuracy for short measurement beam interruptions. The present invention is thus likewise based on the use of a perovskite photodetector element for detecting a measurement beam interruption caused by a flying insect, since detection within sufficiently short timescales is thereby possible in an inexpensive manner.

The method according to the invention for subjecting a flying insect to exterminating radiation has the method steps of:

generating a measurement beam and deflecting the measurement beam such that the measurement beam scans a detector surface of a measurement beam detector having a photodetector element;

detecting the attenuation duration of an attenuation of the measurement beam by way of the measurement beam detector and generating an exterminating beam pulse when the attenuation duration is in a predefined range.

This results in the advantages mentioned with regard to the device according to the invention.

It is desirable for flying insects to be able to be detected over an extensive area. The detector surface of the measurement beam detector therefore advantageously has a length of at least 10 cm, preferably at least 0.5 m, in particular of at least 1 m. The measurement beam preferably scans the detector surface over the predefined length, such that the detector scans a correspondingly large detector surface, within which flying insects are able to be detected, between the deflection unit and the detector surface.

The measurement beam preferably scans the detector surface at a sufficiently high speed such that there is a high likelihood that any flying insect that flies through the area, scanned by the measurement beam, between the deflection unit and the measurement beam detector is also detected. Due to the small size of flying insects, in particular of the particularly relevant mosquitoes, this results in correspondingly short interruption durations when the measurement beam is interrupted by a flying insect. For typical applications, the period for which the flying insect interrupts the measurement beam is less than 10 µs. In preferred applications, this is less than 0.5 µs, down to less than 0.1 µs. An upper limit of less than 10 µs, in particular less than 0.5 µs, preferably less than 0.1 µs is therefore preferably predefined.

An upper limit for the attenuation duration in the range from 0.1 µs to 20 µs is therefore advantageously able to be predefined by way of the evaluation unit. If an upper limit of 10 µs is then for example predefined for the attenuation duration, then an exterminating beam pulse is not output if an interruption of the measurement beam lasts for longer than 10 µs. This rules out a situation whereby the interruption of the measurement beam by a human triggers an exterminating beam pulse.

In one advantageous embodiment, the exterminating beam source and the deflection unit are arranged to interact with one another such that the exterminating beam is able to be deflected by way of the deflection unit. This results in a further simplification of the structure, which thus reduces costs and susceptibility to faults. In this advantageous embodiment, both the measurement beam and the exterminating beam are thus deflected by the same deflection unit.

The deflection unit in particular preferably has a mobile mirror element. The measurement beam is easily able to be deflected by way of the mobile mirror element such that it scans the detector surface of the measurement beam detector. The exterminating beam is likewise advantageously able to be deflected by way of the mirror element in a manner that is likewise structurally simple.

The measurement beam advantageously scans the detector surface repeatedly, particularly preferably continuously repeatedly, in order to allow repeated, in particular constant detection of flying insects.

To this end, the mirror element may be designed as a tilting mirror element, for example by way of piezo elements, in order to generate the repeated scanning of the detector surface.

It is in particular advantageous to design the mirror element as a rotating mirror element. A rotating mirror element constitutes an inexpensive and technically simple mirror element. By way of example, a mirror element may be rotated by way of an electric motor. This does not require any complex electronic controllers, in comparison for example with using piezo elements.

It is in particular advantageous to design the rotating mirror element as a polyhedral mirror element. Such a mirror element thus has a plurality of areal, in particular flat mirrors that are arranged about a common axis of rotation, such that repeated scanning of the detector surface by the measurement beam is easily able to be achieved when the mirror element is rotated in a constant direction of rotation.

Using a mobile mirror element has a further advantage: In one preferred embodiment, as described above, both the measurement beam and the exterminating beam are deflected by way of the mobile mirror element. The flying insect is detected depending on the duration of an attenuation of the measurement beam between the deflection unit and the detector surface. There is accordingly the decision as to whether an exterminating beam pulse is output, preferably only after the measurement beam is no longer attenuated by the flying insect. In the case of a continuously moving mirror element, the flying insect will therefore no longer be in the beam path of the measurement beam at the time, since an exterminating beam pulse is output. Upstream of the mobile mirror element, the beam path of the exterminating beam is therefore advantageously not parallel to the beam path of the measurement beam. In this preferred embodiment, the measurement beam and the exterminating beam thus impinge on the mirror element at different angles. The movement of the mirror element between detection of the flying insect, that is to say interruption of the measurement beam by the flying insect, and emission of the exterminating beam pulse is thereby able to be compensated, such that the flying insect, although it is no longer in the beam path of the measurement beam at the time when the exterminating beam pulse is emitted, is in the beam path of the exterminating beam due to the different angle of incidence.

Upstream of the mobile mirror element, the beam path of the exterminating beam is therefore advantageously rotated with respect to the beam path of the measurement beam by a predefined angle in the direction of rotation of the mobile mirror element. It is in particular advantageous for the predefined angle to be selected so as to compensate a rotation of the mobile mirror element for a predefined time interval. This time interval preferably corresponds to the duration between the end of the interruption of the measurement beam by the flying insect and the emission of the exterminating beam pulse.

In one advantageous embodiment, the impingement of the measurement beam and the exterminating beam on the mirror element at a different angle is advantageously achieved by the measurement beam source and exterminating beam source being arranged such that the measurement beam and the exterminating beam impinge on the polyhedral mirror element 9 at the desired angle. It is likewise within the scope of the invention to use optical elements, such as for example one or more mirrors, to deflect the measurement beam and/or exterminating beam such that they impinge on the mirror element at the desired angle.

In one advantageous embodiment, a beam splitter element, preferably a partly transparent mirror, particularly preferably a semitransparent mirror (intensity distribution 50/50), is arranged in the beam path of the measurement beam and the exterminating beam, such that the measurement beam and the exterminating beam are each split into two partial beams and both partial beams are guided to the optical mirror element at the predefined angle, preferably by way of further optical elements (such as for example a further mirror). In this preferred embodiment, both in the case of the measurement beam and in the case of the exterminating beam, two partial beams each thus impinge on the mirror element at the predefined angle. A further rotation of the mirror element between detection and emission of the exterminating beam pulse is thereby also able to be compensated: The angle between the two partial beams of the measurement beam and the exterminating beam is advantageously selected such that the beam path of one partial beam after reflection following further rotation of the mirror element by a time interval between detection of the mosquito and emission of the exterminating beam pulse corresponds to the beam path of the other partial beam, also after reflection. This thus thereby also ensures that the exterminating beam pulse impinges at least approximately at the location at which the mosquito was detected.

The measurement beam is preferably deflected by the deflection unit at a high speed, such that the flying insect continues to move only slightly in the time between interruption of the measurement beam and lowering of the exterminating beam pulse. The measurement beam is therefore preferably deflected by the deflection unit at an angular speed in the range from 300 rad s$^{-1}$ to 10 000 rad s$^{-1}$, in particular in the range from 700 rad s$^{-1}$ to 3000 rad s$^{-1}$.

In one preferred embodiment, the detector surface of the detector element is formed by a detector surface of the photodetector element. The photodetector element, in particular the perovskite photodetector element, is therefore preferably designed as a strip-shaped detector element having a detector surface that has a high aspect ratio of length to width. As described above, the length of the detector surface is preferably >10 cm, preferably >0.5 m, particularly preferably >1 m. Preferred lengths of >2 m, >5 m or >10 m are in particular within the scope of the invention. As described at the outset, a perovskite detector element has the advantage that rapidly switching detectors having a large-area detector surface are able to be formed inexpensively. The abovementioned advantageous embodiments are therefore advantageous in particular when using a perovskite photodetector element as photodetector element.

In order to save on material costs, the width of the detector surface is by contrast preferably designed to be small. The detector surface of the measurement beam detector advantageously has a width of less than 10 cm, preferably less than 5 cm, more preferably less than 1 cm.

The detector surface is particularly preferably designed as a rectangle. The measurement beam preferably scans the detector surface along a line, particularly preferably along a straight line. In order to achieve high usage of the detector surface, the measurement beam scans the length of the detector field preferably to an extent of at least 90%, in particular to an extent of at least 98%.

In a further preferred embodiment, the detector surface of the detector element is connected to a detector surface of the photodetector element in a light-guiding manner by a light guide element. This allows a further material saving since the measurement beam impinges indirectly or preferably directly on a light guide element by way of which the measurement beam is guided to the detector surface of the photodetector element. In this embodiment, the light beam thus impinges on a detector surface formed by the light guide element or a further upstream optical element and is forwarded to the detector surface of the photodetector element.

The light guide element may be designed as an optical element that is known per se, such as for example a lens. The light guide element is however preferably designed as an optical component by way of which the measurement beam is forwarded through reflection from the interface of the light guide, in particular by way of total reflection. The use of glass fibers as a light guide element is within the scope of the invention. The design of the light guide element as a fluorescence collector is particularly advantageous. A fluorescence collector may be designed as a plexiglass panel with a dye. The structure of a fluorescence collector is described for example in Goetzberger, Greubel. Appl. Phys 14, 123-139 (1977).

When the measurement beam is forwarded from the detector surface of the detector element to the detector surface of the photodetector element by way of a light guide element, the detector surface of the detector element is preferably larger, preferably larger by at least a factor of 5, more preferably by at least a factor of 10, than the detector surface of the photodetector element in order to ensure the material saving described above.

For the present invention, it is advantageous for accurate location detection for the measurement beam not to widen or to widen only slightly. A widening of the measurement beam by less than 1 mm over a beam length of 1 m is in particular advantageous. In order to bundle the exterminating energy, a widening of the exterminating beam by less than 1 mm over a beam length of 1 m, preferably 3 m, is likewise advantageous.

Lasers offer a high energy density, low beam widening and rapid switching times.

The measurement beam source is advantageously designed as a laser, particularly preferably as a diode laser, since this offers an inexpensive and robust design.

As an alternative and particularly preferably in addition, the exterminating beam source is advantageously designed as a laser, preferably as a diode laser; Nd:YAG lasers or the like may furthermore be used.

In the present invention, the flying insect is detected by way of the measurement beam and exterminated by way of the exterminating beam. The measurement beam may therefore preferably have a lower energy density than the exterminating beam, such that there is no or at most a very low risk caused by the measurement beam, and a lower energy consumption is also achieved.

In order to use a measurement beam with a low intensity on the one hand and to achieve a good signal strength of the measurement beam detector on the other hand, in one preferred embodiment, the measurement beam is modulated, particularly preferably with a carrier frequency, preferably with a carrier frequency greater than 50 MHz. The evaluation unit advantageously has an electronic filter that is tuned selectively to the modulation of the measurement beam.

The exterminating beam pulse is preferably selected to be short, such that there is no or only a slight deflection of the exterminating beam during the exterminating beam pulse.

The exterminating beam pulse preferably has a duration of less than 1 its, in particular less than 0.1 µs. It is within the scope of the invention to use a pulse laser as exterminating beam source, particularly advantageously to emit just one pulse of the pulse laser as exterminating beam pulse and more preferably to provide a dead time, preferably in the range from 0.5 s to 5 s, in particular 0.5 s to 2 s, preferably 1 s, between further pulses. Following emission of an exterminating beam pulse, in this advantageous embodiment, the next exterminating beam pulse may thus be emitted only after the dead time has elapsed.

This reduces the risk of incorrect emission of an exterminating beam pulse or an incorrect beam path of the exterminating beam pulse impinging on an eye of a human.

In one advantageous embodiment, the device has a unit beam source that is both measurement beam source and exterminating beam source. In this advantageous embodiment, a further cost reduction and protection against failure is thus reduced since it is necessary to provide just one beam source. The device advantageously has a beam intensity control unit for the unit beam source that is connected to the evaluation unit in order, on the basis of control signals from the evaluation unit, to generate a measurement beam with a measurement beam intensity or an exterminating beam with an exterminating beam intensity higher than the measurement beam intensity, in particular an exterminating beam pulse, by way of the unit beam source.

The power densities of the measurement beam are preferably in the range from 10 mW/cm$^2$ to 300 mW/cm$^2$. The energy densities of the exterminating beam pulse are preferably in the range from 0.1 mJ/cm$^2$ to 100 mJ/cm$^2$, in particular from 0.1 mJ/cm$^2$ to 1 mJ/cm$^2$ for ultraviolet and visible light below red light and/or preferably in the range from 10 mJ/cm$^2$ to 100 mJ/cm$^2$ for red and infrared light. The energy densities of the exterminating beam pulse are preferably in the range from 0.1 mJ/cm$^2$ to 1 mJ/cm$^2$ for wavelengths in the range (250 nm to below 700 nm) and/or preferably in the range from 10 mJ/cm$^2$ to 100 mJ/cm$^2$ for wavelengths in the range (700 nm to 1500 nm).

The wavelength of the measurement beam is preferably in the range from 300 nm to 800 nm. The wavelength of the exterminating beam is preferably in the range from 250 nm to 1500 nm, in particular in the range from 250 nm to 700 nm (ultraviolet and visible light to the red light region) and in the range from 700 nm to 1500 nm (red and infrared light).

At least one fixed mirror element, preferably a curved, in particular arc-shaped mirror element is advantageously arranged in the beam path of the measurement beam and the exterminating beam between the deflection unit and the measurement beam detector. The region scanned by the measurement beam and within which a flying insect is able to be detected is thereby able to be adapted to a desired geometry. By virtue of a suitable arrangement and design of mirror elements, it is thus possible to scan an area between the deflection unit and the measurement detector that corresponds to the surface of a half cylinder or four or five adjoining faces of a cube, such that protection against flying insects is able to be achieved in the manner of the spatial design of a mosquito net.

In the method according to the invention, the measurement beam preferably scans the detector surface over a length of at least 10 cm, preferably at least 0.5 m, in particular at least 1 m, in order to achieve the abovementioned advantages.

In one preferred development of the above-described preferred embodiment having a mobile mirror element, at the time when an attenuation of the measurement beam is detected, which is intended to lead to the outputting of an exterminating beam pulse, a mirror of the mirror element is in an orientation in relation to the measurement beam source in which the measurement beam impinges on the flying insect. The exterminating beam pulse in this preferred embodiment is output as soon as a mirror of the mirror element is in the same orientation described above. This is the case in particular when the mirror element has performed a 360° rotation about the axis of rotation of the mirror element following detection of the flying insect.

In a further preferred development, there is provision for a rotational position determination unit of the device to determine the orientation of the mirror element in relation to the measurement beam source, preferably on the basis of parameters such as for example a rotational speed of the mirror element, a rotation time of the mirror element, a covered rotational path of the mirror element or a combination of these parameters. The rotational position determination unit is connected to the evaluation unit and designed to interact therewith in order to control the exterminating beam source such that—as described above—an exterminating beam pulse is output as soon as a mirror of the mirror element is in the same orientation described above, in particular as soon as the mirror element has performed a 360° rotation about the axis of rotation of the mirror element following detection of the flying insect.

As described above, the measurement beam and exterminating beam are preferably deflected by way of the deflection element.

Within the context of the present application, the flying insect interrupting the measurement beam also describes cases in which the intensity of the measurement beam is not completely reduced by the interruption, but rather is just partly attenuated.

The present invention thus has the advantages that imaging errors in an optical system (for example when using a camera) and delays in the detection when using complex optical detectors and capturing a spatially resolved image are avoided, since detection takes place during transmission of the measurement beam and not on the basis of a reflection of the measurement beam, preferably by way of a spatially changeable laser beam that is deflected by way of the deflection unit. This allows locating that is considerably more accurate in terms of time and less complex.

Safety requirements in terms of operating the exterminating beam source are thereby able to be reduced considerably, such that for example use inside buildings becomes possible. Using a perovskite photodetector element, that is to say a photodetector element based on perovskite.

The evaluation unit advantageously has a high-pass filter in order to ascertain signal changes that are shorter than a predefined upper limit for an attenuation duration. Such a high-pass filter is likewise able to be designed inexpensively and robustly.

The device advantageously has a dead time element that is connected upstream of the exterminating beam source and predefines a minimum pause duration between two successive exterminating beam pulses. As an alternative or preferably in addition, the dead time element is furthermore designed to limit the duration of the exterminating beam pulse to a maximum duration. The exterminating beam source is particularly preferably operated via an upstream charging element as dead time element, preferably a resistor/capacitor element, in order to avoid an unintended multiple and/or relatively long exterminating signal.

The dead time element is preferably designed for a minimum pause duration in the range from 0.1 s to 10 s between two successive exterminating beam pulses. As an alternative or preferably in addition, the dead time element is designed for a maximum duration of an exterminating beam pulse in the range from 0.5 s to 2 s.

BRIEF DESCRIPTION OF THE DRAWINGS

Further advantageous features and embodiments are explained below with reference to exemplary embodiments and figures, in which.

DETAILED DESCRIPTION

The Figures show schematic illustrations that are not to scale. The same reference signs denote identical or functionally identical elements.

Figure 1:
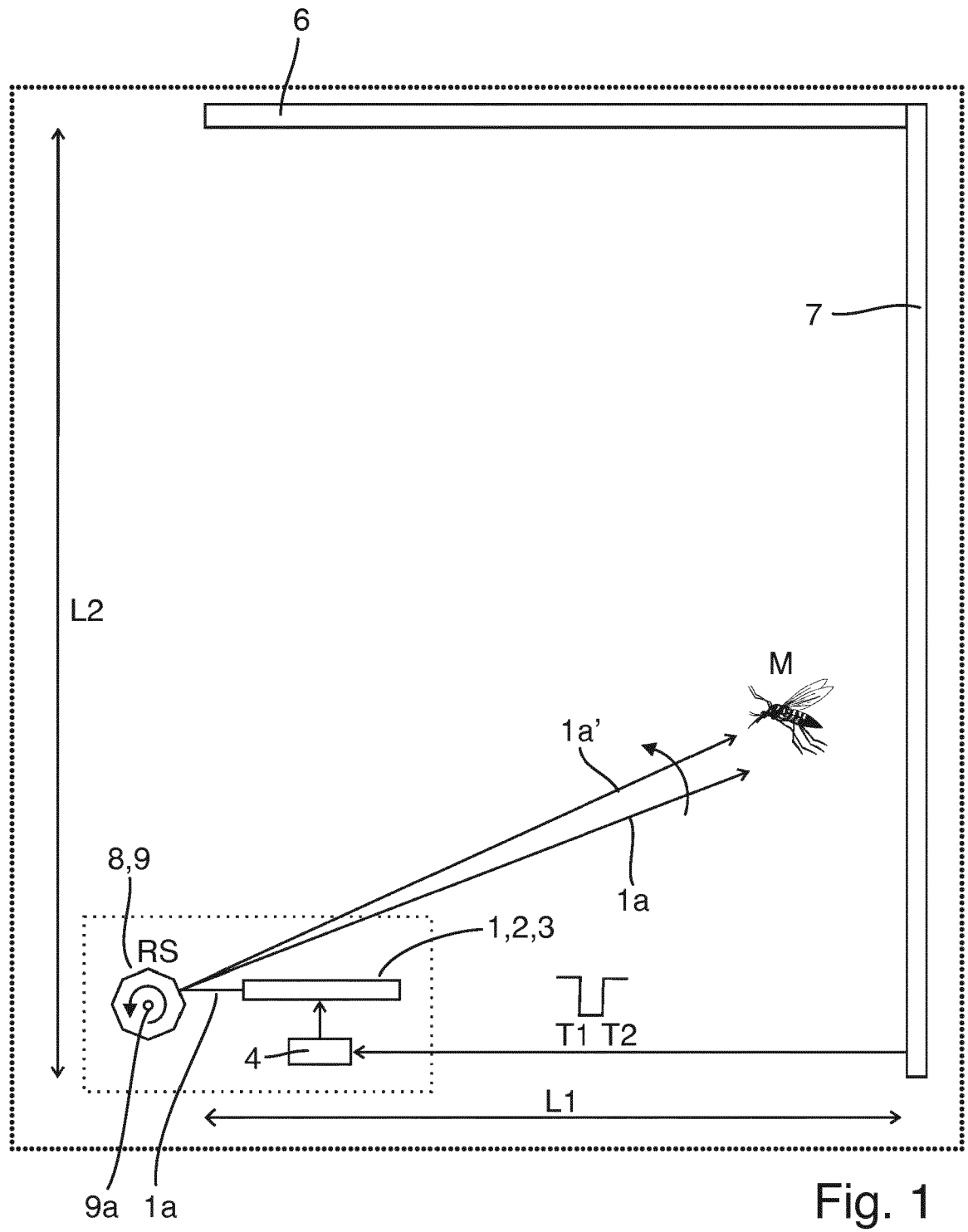
FIG. 1 shows a first exemplary embodiment of a device according to the invention.

The first exemplary embodiment illustrated in FIG. 1 of a device for subjecting a flying insect, in this case a mosquito M, to exterminating radiation has a measurement beam source 1 and an exterminating beam source 2. In this exemplary embodiment, there is provision for a unit beam source 3 that is thus used both as measurement beam source 1 and as exterminating beam source 2. The device has an evaluation unit (controller) 4 that is at the same time designed as a control unit for the unit beam source 3.

A measurement beam detector 5 of the device has two photodetector elements designed as perovskite photodetector elements 6 and 7.

The device also has a deflection unit 8. The deflection unit 8 has a mobile mirror element that is designed as a polyhedral mirror element 9. Perpendicular to an axis of rotation 9a of the polyhedral mirror element, this thus has the cross-sectional area of a regular octagon. Eight mirror surfaces are thus formed on the outer sides of the polyhedral mirror element 9. The deflection unit 8 also has a motor, in this case an electric motor, in order to rotate the polyhedral mirror element 9 about the axis of rotation 9a in the direction of rotation illustrated by way of an arrow.

The perovskite photodetector elements 6 and 7 are arranged at a right angle with respect to one another and each have a detector surface along the longer side that faces the deflection unit 8. The detector surfaces are thus perpendicular to the plane of the drawing in FIG. 1. The perovskite photodetector element 6 has a length L1 of 1 m and the perovskite element 7 has a length L2 of 2 m. The width of the detector surfaces of the perovskite photodetector elements 6 and 7 (thus perpendicular to the plane of the drawing in FIG. 1) is 1 cm.

In this exemplary embodiment, the two detector surfaces of the perovskite photodetector elements 6 and 7 thus form the detector surface of the measurement beam detector.

The unit beam source 3 is then controlled by way of the evaluation unit 4 such that it continuously emits a laser beam with a wavelength of 532 nm and a light intensity of 100 mW/cm$^2$ and thus serves as measurement beam source 1.

The measurement beam 1a generated thereby is reflected by the polyhedral mirror element 9 from the deflection unit 8 and thus scans both the detector surface of the perovskite photodetector element 6 and that of the perovskite photodetector element 7. In the case of continuous of the polyhedral mirror element 9 about the axis of rotation 9a in the illustrated direction of rotation, there is thus continuous scanning of the detector surfaces in the illustration according to FIG. 1, starting from the bottom right toward the top right and from the top right to the top left, before this procedure is repeated with the following mirror surface of the polyhedral mirror element 9.

The change in the beam path of the measurement beam 1a to a measurement beam 1a' at a later time is illustrated by way of example.

The polyhedral mirror element 9 rotates at a constant rotational speed, such that an angular speed of 1571 rad/s$^{-1}$ results for the measurement beam 1a between the polyhedral mirror element 9 and measurement beam detector surfaces. If a mosquito M (illustrated in highly magnified form) is then in the region that is located from the measurement beam 1a between the deflection unit 8 and the detector surface of the measurement beam detector, then the mosquito M interrupts the measurement beam 1a or at least decreases the intensity thereof. Due to the high angular speed resulting from the high rotational speed of the polyhedral mirror element 9, the duration of this interruption in the measurement beam 1a by the mosquito M is in this case just a value in the range from 6 μs to 0.2 μs, depending on the distance between the mosquito 1 and the polyhedral mirror element 9.

The signal outputs of the perovskite photodetector elements 6 and 7 are connected in parallel and connected in a signal-conducting manner to the evaluation unit 4. Interruption of the measurement beam 1a by the mosquito M thus leads to a signal outage between a time T1 and T2, as illustrated schematically in the lower region of FIG. 1.

The evaluation unit 4 is designed to ascertain such a signal outage and thus such an attenuation of the measurement beam 1a between the deflection unit 8 and the detector surface of the measurement beam detector 5. The evaluation unit 4 furthermore has a bandpass filter in order to filter measurement beam interruptions in the range from 8 µs to 0.1 µs. If there is a measurement beam interruption having a duration in this range, then the evaluation unit 4 controls the unit beam source 3 such that a laser beam pulse having a length of 1 µs, a wavelength of 1064 nm and a light intensity of 30 mJ/cm$^2$ is emitted by way of the unit beam source 3. In this mode, the unit beam source 3 thus serves as exterminating beam source 2 for emitting an exterminating beam pulse.

The exterminating beam pulse serves to exterminate the mosquito M.

When the mosquito M is detected by way of the measurement beam 1a, the polyhedral mirror element 9 is in an orientation in relation to the measurement beam source 1, in which orientation the measurement beam 1a impinges on a mirror surface of the polyhedral mirror element 9 at a first angle.

In a further advantageous embodiment, the exterminating beam pulse is output when a mirror surface of the polyhedral mirror element 9 is again in this orientation.

This is the case in particular when the polyhedral mirror element 9 has performed a 360° rotation about the axis of rotation 9a after the mosquito M has been detected. In the case of a polyhedral mirror element 9 having a regular n-sided cross-sectional surface, the desired orientation is also achieved following rotation about an angle of 360° divided by n or integer multiples thereof. In the case of a polyhedral mirror element 9 with an octagonal cross section, this condition is met for the case of a 45° rotation of the polyhedral mirror element 9 about the axis of rotation 9a, or for integer multiples of this 45° rotation.

As already mentioned above, the measurement beam 1a and the exterminating beam pulse are advantageously generated by the unit beam source 3, such that the exterminating beam pulse is output as soon as a mirror surface of the polyhedral mirror element 9 is in an orientation in relation to the unit beam source 3 in which the mosquito M was detected by way of the measurement beam.

The relative orientation of the polyhedral mirror element 9 with respect to the measurement beam source 1 is determined in the present exemplary embodiment by a rotational position determination unit. The rotational position determination unit determines the orientation on the basis of parameters, such as for example a rotational speed of the polyhedral mirror element 9, a rotation time of the polyhedral mirror element 9, a covered rotation path of the polyhedral mirror element 9 or combinations of these parameters.

Figure 1A:
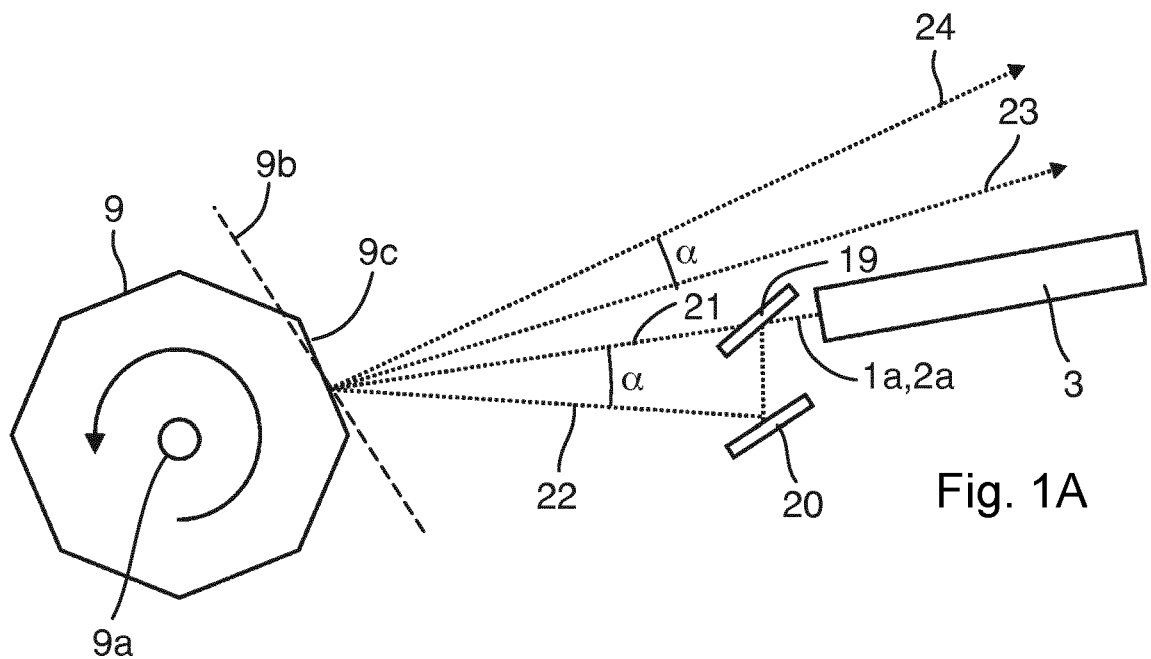
FIG. 1A shows a detailed magnification from FIG. 1.

FIG. 1 illustrates the beam path between the unit beam source 3 and deflection unit 8 only schematically and without details of optical components for the purpose of better clarity. FIG. 1A therefore shows a detailed section for the more detailed illustration of this partial region:

The deflection unit 8 comprises two mirror elements 19 and 20 in addition to the polyhedral mirror element 9. The mirror element 19 is designed as a semitransparent mirror element, that is to say approximately 50% of the beam intensity of a light beam emanating from the unit beam source 3 follows a beam path in accordance with partial beam 21, and is reflected from the mirror surface 9c (solid line) of the polyhedral mirror element 9 in accordance with partial beam 24. Another approximately 50% of the light intensity, following additional deflection by the mirror 20, follows the beam path of partial beam 22 and is reflected in accordance with partial beam 23.

In this exemplary embodiment, two partial measurement beams of the measurement beam 1a generated by way of the unit beam source 3 are thus emitted, wherein a first partial measurement beam is emitted along the beam path 24 with approximately 50% intensity of the output beam and a second measurement beam is emitted along the beam path 23, likewise with approximately 50% of the intensity of the output beam. Due to the high rotational speed of the polyhedral mirror element 9, however, only the first partial beam in accordance with beam path 24 is relevant to the detection of the mosquito M: It is virtually impossible for a mosquito M to enter into the detection region only after passing through the measurement beam in accordance with beam path 24 and thus to be detected only by the second partial beam of the measurement beam in accordance with beam path 23. For the relevant cases, the mosquito M is thus typically scanned and there is thus interruption both of the measurement partial beam in accordance with beam path 24 and (following further rotation of the polyhedral mirror element 9) of the second partial measurement beam, which has a slightly changed beam path in comparison with beam path 23 according to FIG. 1A depending on the rotation that has taken place in the meantime.

It is thus possible for two signal outages to take place (a first signal outage caused by the interruption of the first measurement partial beam and a second signal outage caused by interruption of the second measurement partial beam) due to the two partial beams when the mosquito M is detected, depending on the distance between the mosquito M and the polyhedral mirror element 9. Sufficient functionality is however already achieved since only in each case the first signal outage is detected and an exterminating beam pulse is then generated as described above. After the exterminating beam pulse has been generated, a sufficiently long time interval is exceeded, such that the second measurement partial beam is also no longer interrupted by the mosquito M, and there is thus no second triggering of an exterminating beam pulse due to the interruption by the second measurement partial beam:

After the signal outage has been detected through interruption of the first measurement partial beam in accordance with beam path 24, an exterminating beam pulse is emitted by way of the unit beam source 3. The exterminating beam pulse is also split into two partial beams at the semitransparent mirror 19, which partial beams have firstly the beam path 21 and secondly, following reflection from the mirror element 20, the beam path 22. At the time when the exterminating beam pulse is emitted, the polyhedral mirror element 9 has already rotated further. FIG. 1A schematically illustrates, through the dashed line 9b, the rotated position of the mirror surface 9c of the polyhedral mirror element 9 at the time of emission of the exterminating beam pulse. The polyhedral mirror element 9 and the mirrors 19 and 20 are then arranged so as to interact with one another such that the angle α enclosed by the partial beams corresponds approximately to the angle between 9c and 9b, that is to say approximately to the angle by which the mirror surface 9c rotated further between detection of the mosquito M and emission of the exterminating beam pulse.

This achieves a situation whereby, at the time when the mosquito is detected, a beam path in accordance with partial beam 24, upon reflection from the mirror surface 9c at the time when the exterminating beam pulse is transmitted, corresponds approximately to the beam path upon reflection from the mirror surface 9b that is now slightly rotated, that is to say the exterminating beam pulse, which is reflected at the mirror surface 9b along beam path 22, runs approximately in accordance with partial beam 24 following reflection in the illustration according to FIG. 1A, and thus impinges approximately at the same location at which the mosquito M was detected.

Figure 1B:
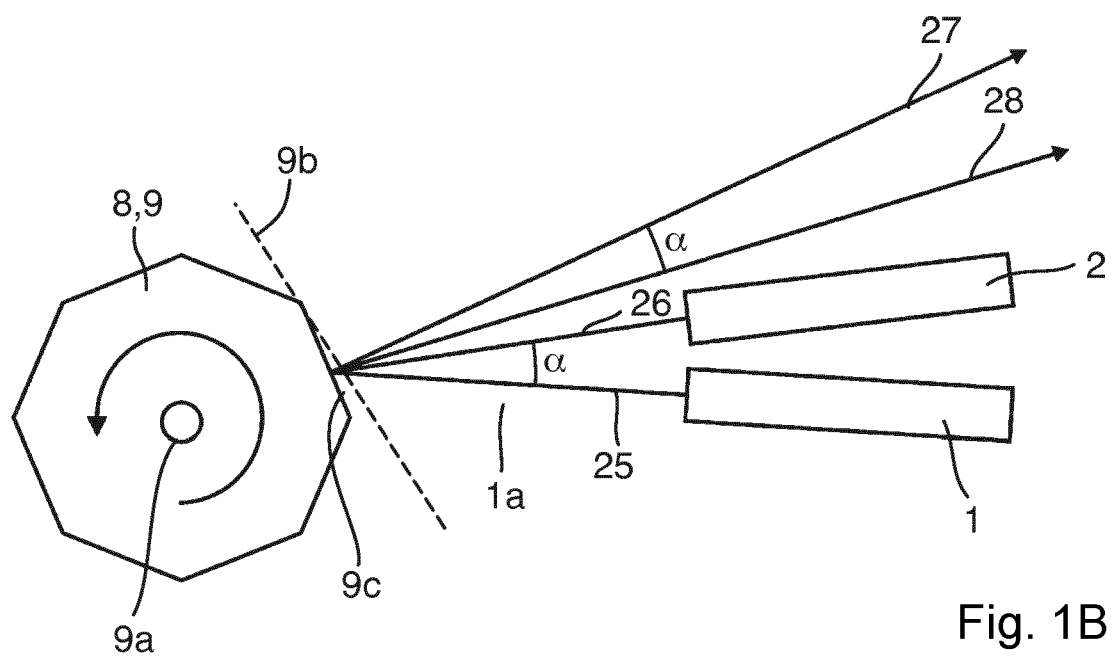
FIG. 1B shows an alternative configuration of the detailed magnification according to FIG. 1A.

FIG. 1B illustrates an alternative preferred embodiment with an alternative exemplary embodiment:

In this exemplary embodiment, two separate beam sources, a measurement beam source 1 and an exterminating beam source 2, are used. These are arranged such that the beam paths of the measurement beam 1a and the exterminating beam 2a are not parallel before impinging on the polyhedral mirror element 9, but rather enclose an angle α. For a mirror element 9c of the polyhedral mirror element 9, this thus results in a beam path 25 before and 27 after reflection from the mirror element 9c and a beam path in accordance with beam 26 before and 28 after reflection from the mirror element 9c.

In this case too, the arrangement of the measurement beam source 1 and the exterminating beam source 2 and thus the angle α are however selected such that the angle α at least approximately compensates a further rotation of the polyhedral mirror element 9 between detection of the mosquito M and emission of the exterminating beam pulse:

If for example, in the position in accordance with mirror element 9c (solid line), a mosquito is detected by the measurement beam source 1 and a measurement beam in accordance with beam paths 25 and 27 (this mosquito interrupting the measurement beam 27) and an exterminating beam pulse is then emitted, then the exterminating beam pulse is emitted at a time at which the mirror surface 9c is already tilted due to the further rotation of the polyhedral mirror element 9, as illustrated schematically by the dashed line 9b in FIG. 1B. The exterminating beam pulse that is emitted by the exterminating beam source 2 in accordance with beam path 26 is thus reflected approximately at a mirror surface 9b, such that the beam path of the exterminating beam pulse is approximately likewise in accordance with beam direction 27 following reflection.

In this exemplary embodiment too, a situation is thus achieved whereby the exterminating beam pulse impinges at approximately the same location at which the mosquito M was detected, despite the further rotation of the polyhedral mirror element 9 between detection and emission of the exterminating beam pulse.

Figure 2:
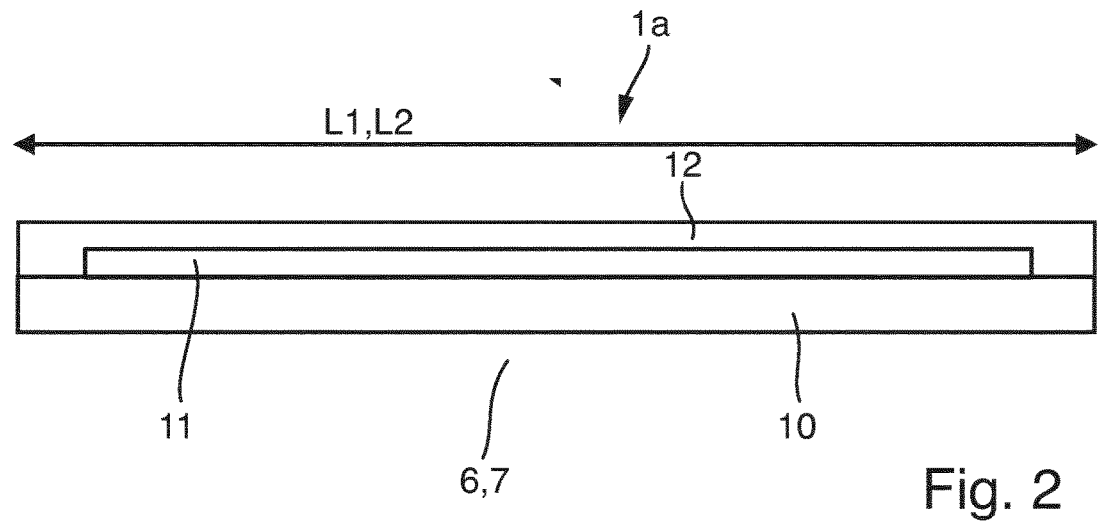
FIGS. 2 and 3 show two exemplary embodiments of measurement beam detectors.

FIG. 2 schematically illustrates the structure of the perovskite photodetector elements 6 and 7: A photosensor element 11, which is based on perovskite, is arranged on a substrate 10 (in this case in the form of a metal foil). The photosensor element 11 is protected by a transparent cover 12.

Figure 3:
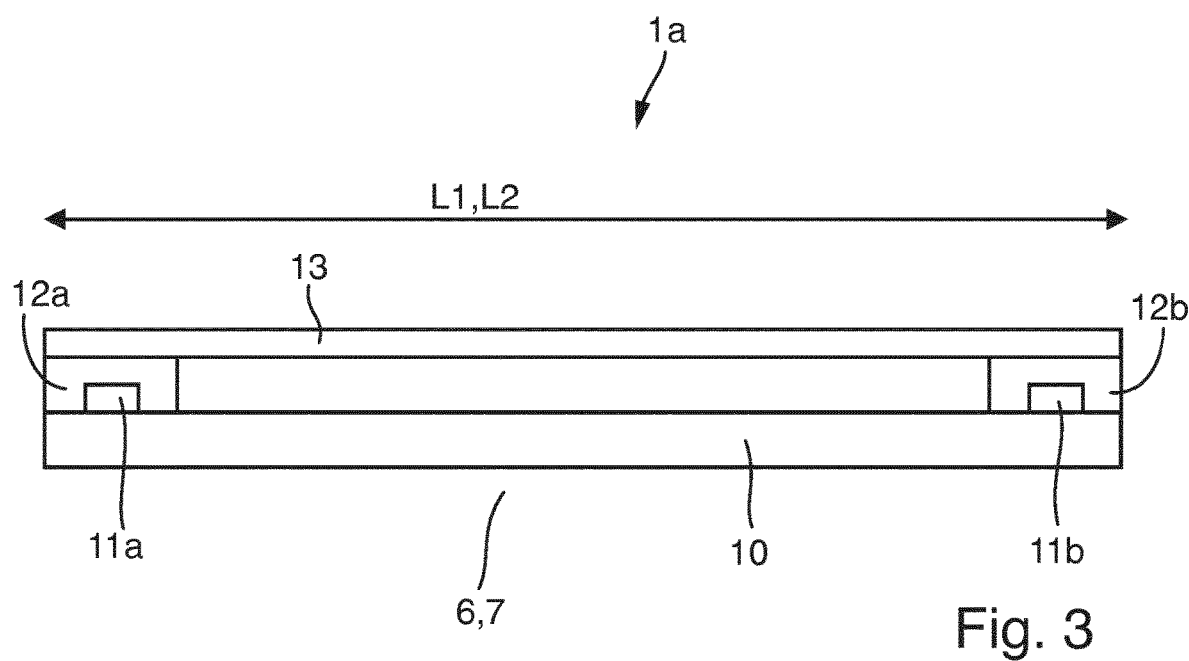

FIG. 3 illustrates an alternative design for the photodetector elements 6 and 7: In this case, two perovskite-based photosensor elements 11a and 11b are arranged on the substrate 10 and are each protected by a transparent cover 12a and 12b. A light-absorbent, fluorescent light guide element 13, in this case plexiglass containing fluorescent dyes, is situated on the transparent covers 12a and 12b. If the measurement beam then enters the light guide element 13, then light is absorbed, reemitted through fluorescence and forwarded, via the covers 12a or 12b, to one of the photosensor elements 11a or 11b by way of total reflection.

In this exemplary embodiment, the detector surface of the detector element is thus connected to the detector surfaces of the perovskite-based photosensor elements 11a and 11b in a light-guiding manner by a light guide element, in this case the light guide material 14.

Figure 4:
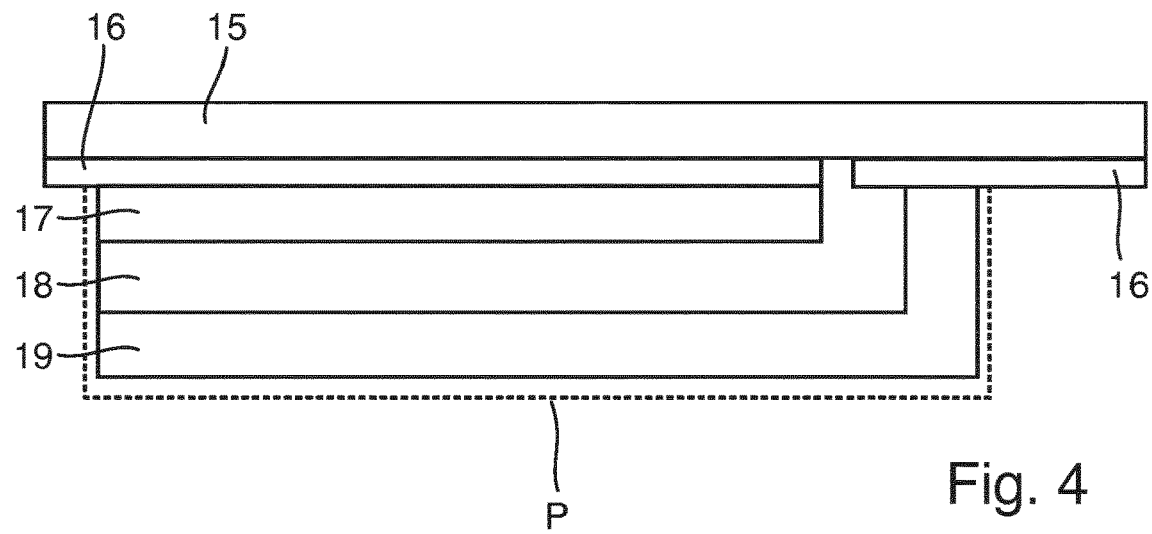
FIG. 4 shows an exemplary embodiment of a perovskite photodetector element.

FIG. 4 illustrates an exemplary embodiment of a perovskite photodetector element 11. FIG. 4 shows a cross section perpendicular to the plane of the drawing according to FIG. 2 in greater detail. The photodetector element has a transparent substrate 15, in this case glass having a thickness of 2 mm, a transparent, electrically conductive layer 16, in this case fluorine-doped tin oxide, having a thickness of 0.5 μm, an electron-selective or hole-selective layer 17, in this case porous titanium dioxide, having a thickness of 200 nm, a further electrically insulating porous layer 18, in this case porous zirconium oxide, having a thickness of 1 μm and a counterelectrode 19. The counterelectrode 16, in this case micronized graphite having a thickness of 10 μm. The counterelectrode 16 is separated by an interruption 17 of the transparent, electrically conductive layer 16. The dashed line P comprises the elements, referred to as perovskite absorbers, which are embedded in the porous layer. Such an exemplary structure and further possible architectures are described in Wagner et al., ACS Energy Letters (just accepted) DOI: 10.1021/acsenergylett.8b00293 and Abate et al., DOI: 10.1002/chem.201704507.

Figure 5:
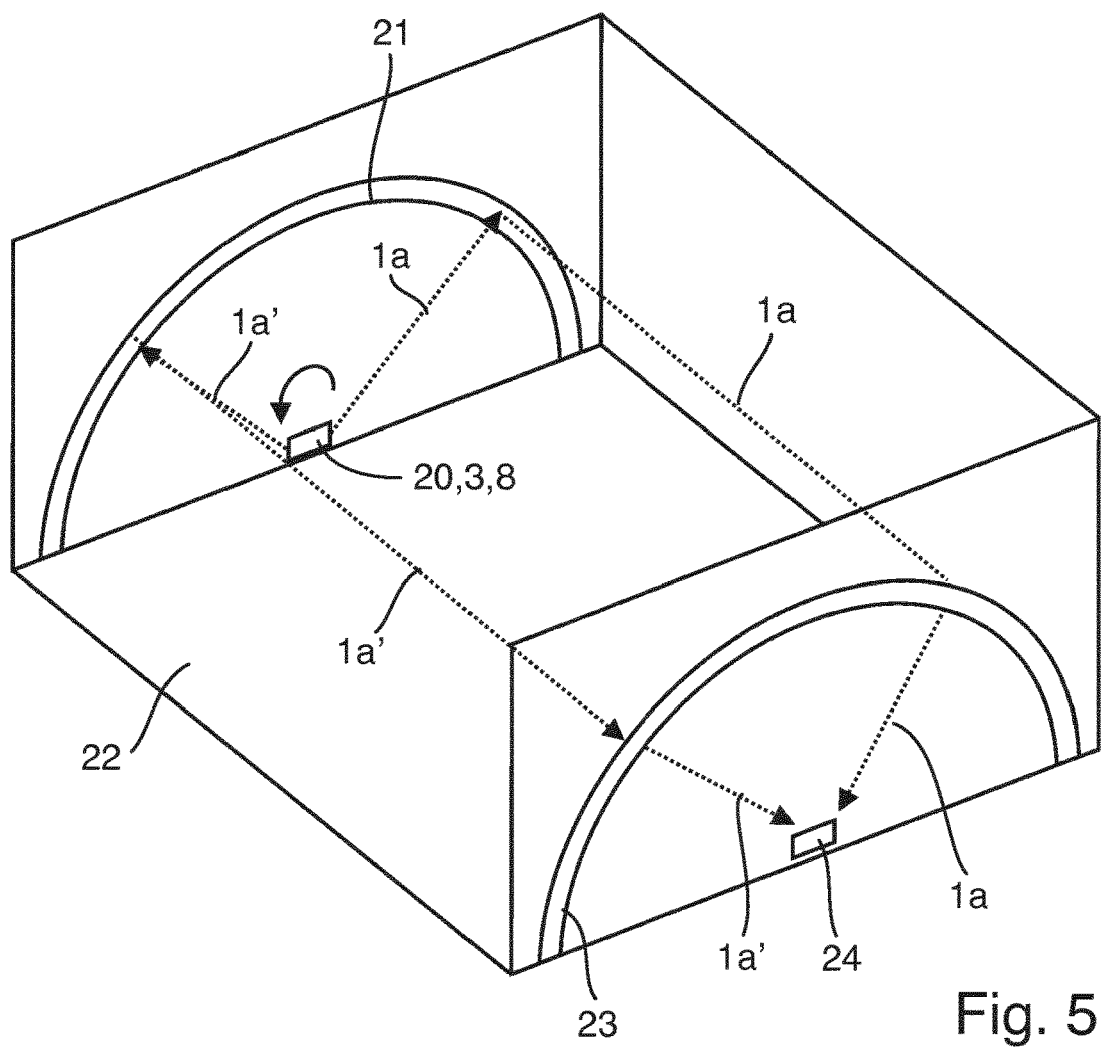
FIG. 5 shows a second exemplary embodiment of a device according to the invention.

FIG. 5 illustrates a further exemplary embodiment of a device according to the invention. In this exemplary embodiment, two semicircular arc-shaped—and thus curved—mirror elements are arranged in the beam path of the measurement beam between the deflection unit and the measurement beam detector. Starting from a unit beam source having a deflection unit, summarized in this case with reference sign 20, a measurement beam is guided to the reflective inner side of a first arc-shaped mirror element 21. The unit beam source 3 and the deflection unit 8 are designed in the same way as in the first exemplary embodiment. The inner side of the mirror element 21 has a 45° angle with respect to the measurement beam 1a, such that this is forwarded, parallel to a surface 22, to a second arc-shaped mirror element 23. This likewise has a reflective surface that is at a 45° angle with respect to the measurement beam 1a, such that the measurement beam is guided to a measurement beam detector 24 and impinges there on the measurement beam detector surface and scans same.

The measurement beam 1a thus scans a surface that corresponds to the side, base and top surface of a horizontal half cylinder. A spatial region is thereby thus able to be protected against flying insects in the manner of a mosquito net.

The invention claimed is:

1. A device for subjecting a flying insect to exterminating radiation, the device comprising:
a unit beam source (1) for generating a measurement beam,
a deflection unit (8) for deflecting the measurement beam,
an exterminating beam source (2) for generating an exterminating beam,
a measurement beam detector having a photodetector element (6, 7),
the deflection unit (8) and the measurement beam detector are arranged and configured to interact with one another such that the measurement beam (1a) scans a detector surface of the measurement beam detector, and
an evaluation unit (4) connected to the measurement beam detector and the exterminating light source that is configured to ascertain an attenuation duration of an attenuation of the measurement beam between the deflection unit (8) and the detector surface and to actuate the exterminating light source so as to output an exterminating beam pulse based on the attenuation duration.

2. The device as claimed in claim 1, wherein the photodetector element (6, 7) is a perovskite photodetector element.

3. The device as claimed in claim 1, wherein the detector surface of the measurement beam detector has a length of at least 10 cm.

4. The device as claimed in claim 1, wherein an upper limit for the attenuation duration in a range from 0.5 µs to 20 µs is predefined by the evaluation unit (4).

5. The device as claimed in claim 1, wherein the exterminating beam source (2) and the deflection unit (8) are arranged to interact with one another such that the exterminating beam is deflectable by way of the deflection unit (8).

6. The method as claimed in claim 5, wherein the deflection unit (8) has a mobile mirror element.

7. The device as claimed in claim 6, wherein the measurement beam and the exterminating beam do not impinge on the mobile mirror element in parallel.

8. The device as claimed in claim 7, wherein a beam path of the exterminating beam does not run parallel with a beam path of the measurement beam upstream of the mobile mirror element, the beam path of the exterminating beam is adapted to be rotated with respect to the beam path of the measurement beam by a predefined angle in a direction of rotation of the mobile mirror element upstream of the mobile mirror element.

9. The device as claimed in claim 8, wherein the predefined angle is selected so as to compensate a rotation of the mobile mirror element for a predefined time interval.

10. The device as claimed in claim 7, wherein the measurement beam and the exterminating beam impinge on the mobile mirror element at a predefined angle relative to one another.

11. The device as claimed in claim 6, wherein the mobile mirror is a rotating mirror.

12. The device as claimed in claim 1, wherein the detector surface of the detector element is formed by a detector surface of a perovskite photodetector element.

13. The device as claimed in claim 1, wherein the detector surface of the detector element is connected to a detector surface of a perovskite photodetector element in a light-guiding manner by a light guide element, and the detector surface is than the detector surface of the perovskite photodetector element.

14. The device as claimed in claim 1, further comprising a unit beam source (3) includes both the unit beam source (1) and the exterminating beam source (2), and the device has a beam intensity control unit for the unit beam source (3) that is connected to the evaluation unit (4) in order, on the basis of control signals from the evaluation unit (4), to generate the measurement beam with a measurement beam intensity or the exterminating beam with an exterminating intensity higher than the measurement beam intensity.

15. The device as claimed in claim 1, further comprising at least one fixed mirror element arranged in a beam path of the measurement beam and the exterminating beam between the deflection unit (8) and the measurement beam detector, the detection surface comprises a plurality of flat surfaces, and the detection surface is arranged along at least two edge surfaces of a building opening.

16. The device as claimed in claim 15, wherein the detection surface runs along at least two walls of a room.

17. A method for subjecting a flying insect to exterminating radiation, comprising the steps of:
  a. generating a measurement beam and deflecting the measurement beam such that the measurement beam (1*a*) scans a detector surface of a measurement beam detector having a perovskite photodetector element;
  b. detecting an attenuation duration of an attenuation of the measurement beam by way of the measurement beam detector, and
  c. generating an exterminating beam pulse when the attenuation duration is in a predefined range.

18. The method as claimed in claim 17, wherein the measurement beam scans the detector surface over a length of at least 10 cm.

19. The method as claimed in claim 17, wherein the measurement beam (1*a*) and exterminating beam are deflected by way of the deflection element.

20. The method of claim 17, further comprising detecting a flying insect with the measurement beam.

* * * * *